United States Patent [19]

Walker

[11] Patent Number: 5,137,545
[45] Date of Patent: Aug. 11, 1992

[54] VAPOR CLARIFICATION SYSTEM AND METHOD

[75] Inventor: David R. Walker, Clearwater, Fla.

[73] Assignee: Combustion Design Corporation, Tampa, Fla.

[21] Appl. No.: 510,246

[22] Filed: Apr. 19, 1990

[51] Int. Cl.$^5$ .............................................. B01D 45/12
[52] U.S. Cl. ........................................... 55/1; 55/349; 55/473; 55/459.1; 34/57 R
[58] Field of Search .......................... 34/57, 58, 79, 84; 55/1, 349, 467, 476

[56] References Cited

U.S. PATENT DOCUMENTS

| | | | |
|---|---|---|---|
| 1,315,284 | 9/1919 | Stevens | 55/1 |
| 1,937,095 | 11/1933 | Prat | 55/345 |
| 3,601,900 | 8/1971 | Evisman et al. | 34/79 |
| 3,801,264 | 4/1974 | Lind | 432/37 |
| 4,517,902 | 5/1985 | Christian | 110/190 |
| 4,574,711 | 3/1986 | Christian | 110/264 |

FOREIGN PATENT DOCUMENTS

| | | | |
|---|---|---|---|
| 2030009 | 6/1970 | Fed. Rep. of Germany | 55/467 |
| 288190 | 8/1928 | United Kingdom | 55/345 |

Primary Examiner—Bernard Nozick
Attorney, Agent, or Firm—Foley & Lardner

[57] ABSTRACT

A vapor clarification system includes a suction box and a plurality of fans located on top of the suction box. The fans withdraws a moisture-laden stream from the suction box and centrifugally accelerates it, producing a clarified vapor stream and a secondary vapor stream that is heavily laden with particulate matter. The secondary vapor stream leaving each fan passes through a cyclone, where particulate matter falls out of the vapor stream. The partially clarified vapor stream leaving the cyclone is returned to the suction box and re-accelerated in the fans. By placing the fans on top of the suction box, there is a reduction in the temperature drop occurring in the vapor stream which exits the fans; this in turn reduces condensation and improves the efficiency of the system. Primary cyclones are preferably disposed within the suction box, and secondary cyclones may be placed outside of the suction box. The number of fans can also be modified to meet varying system requirements, thus providing a more flexible air-clarification system.

18 Claims, 18 Drawing Sheets

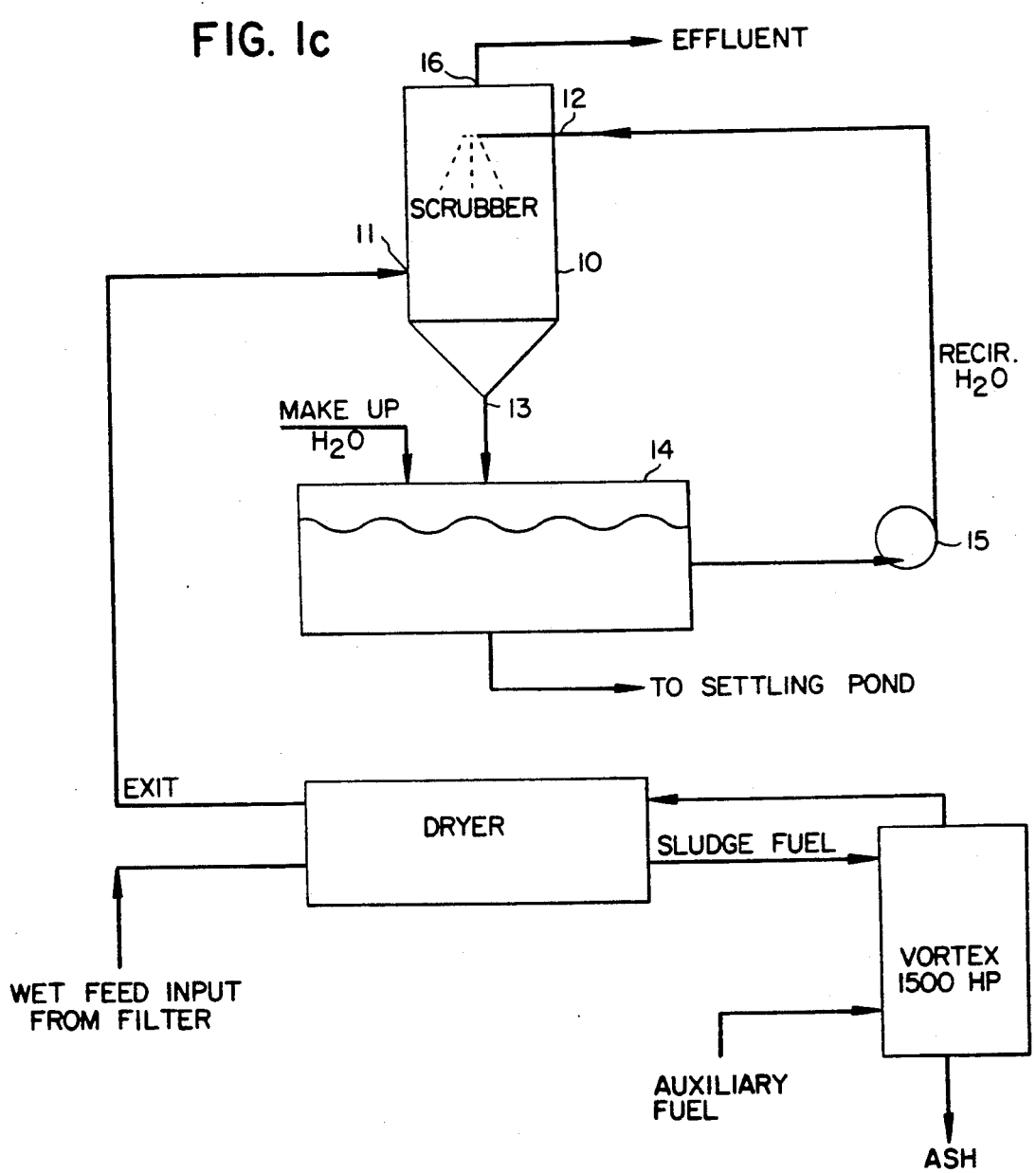

ROTATION

VAPOR CLARIFICATION SYSTEM AND METHOD

BACKGROUND OF THE INVENTION

The present invention relates to a dust control system, more particularly to a system of removing dust and particulate matter from a moisture-laden vapor stream that is heavily laden with particulates, such as a vapor stream leaving a dryer assembly of a waste treatment system.

Environmental concerns have motivated a search for waste disposal systems capable of disposing of waste materials in accordance with the applicable regulating standards. The most widely used of these disposal means comprises incinerating the waste materials. Incineration of such waste is most efficient if the material is dried by conveying it through a dryer where it is mixed with hot gasses prior to combustion. For example, U.S. Pat. No. 3,801,264 (Lindl) discloses a system in which waste materials are conveyed through a dryer where they are mixed with exhaust gasses from a burner before they are incinerated. This system removes the vapors exiting the dryer via a conventional fan, and passes the vapors through a single cyclone and a scrubber before they are either emitted to the atmosphere or conveyed to the inlet of the burner. But the single-step clarification process performed by this system is ineffective to adequately clean the vapor. In fact, only those particles that are heavy enough to fall out of the vapor at ordinary vapor-stream velocities are removed by the cyclone. Furthermore, the moisture-laden vapor tends to condense on the surface of the cyclone, reducing the efficiency of the clarification operation. In many instances, the scrubber is unable to remove an adequate amount of the particulates. This system is thus often incapable of removing enough particulates from the vapor to meet existing environmental standards. Moreover, this system is inherently inflexible, as its operational parameters are limited by the operational limits of the single fan.

SUMMARY OF THE INVENTION

It is therefore an object of the present invention to provide a vapor clarification system that is flexible and that can effectively remove particulates from moisture-laden vapors.

It is a further object of this invention to provide a method for effectively removing particulates from moisture-laden vapors, thereby preventing further pollution.

In achieving the stated objects, the present invention provides for a vapor clarification system including an air-clarifier means for separating particulate matter from a moisture laden vapor stream, and means for drawing moisture-laden vapor into the air clarifier means. The air clarifier means comprises a suction box and means for accelerating the moisture laden vapor stream such that particulate matter is centrifugally separated to produce a clarified vapor stream and a secondary vapor stream.

According to another aspect of the present invention, the system further includes a cyclone in which particulate mater including fine dust is removed from the secondary vapor stream and a conduit which communicates with the cyclone and which returns the secondary vapor stream to the suction box.

In accordance with another aspect of the invention, the accelerating means includes a series of accelerating chambers adapted to accelerate the moisture-laden vapor stream centrifugally and a series of separating chambers. Each of the separating chambers is adapted to separate the moisture-laden vapor stream into the clarified vapor stream and the secondary vapor stream.

In accordance with yet another aspect of the present invention, a method is provided for clarifying moisture-laden vapor, including the steps of drawing the moisture laden vapor into an air clarifier, and then accelerating the moisture-laden vapor within the air clarifier such that particulate matter is centrifugally separated to produce a clarified vapor stream and a secondary vapor stream.

In accordance with still another aspect of the invention, the further steps are provided of removing particulate matter, including fine dust, from the secondary vapor stream. The secondary vapor stream is then accelerated within the air clarifier such that particulate matter is centrifugally separated from the secondary vapor stream.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1c is a flow chart depicting a scrubber system usable in connection with an embodiment of the present invention.

DETAILED DESCRIPTION OF THE PREFERRED EMBODIMENTS

Pursuant to the present invention, the vapor clarification system includes a suction box and a plurality of fans located on top of the suction box. The fans withdraw materials from the suction box and centrifugally accelerate them, producing a clarified vapor stream and a secondary vapor stream that is heavily laden with particulate matter. The secondary vapor stream leaving each fan passes through a cyclone, where particulate matter falls out of the vapor stream. The somewhat clarified vapor stream leaving the cyclone is returned to the suction box and re-accelerated in the fans. By placing the fans on top of the suction box, the temperature drop of vapor exiting the fans is reduced, thereby reducing condensation and improving the efficiency of the system. Primary cyclones are preferably disposed within the suction box and secondary cyclones may be placed outside of the suction box, if required by system parameters. The number of fans can also be modified to meet varying system requirements, thereby providing a more flexible air-clarification system.

The vapor clarification system of the present invention is preferably used in conjunction with a system which conditions and incinerates waste materials of widely varying moisture contents. A detailed description of a preferred embodiment of the clarification system and a system in which the clarification system can be incorporated follows.

Figure 1A:
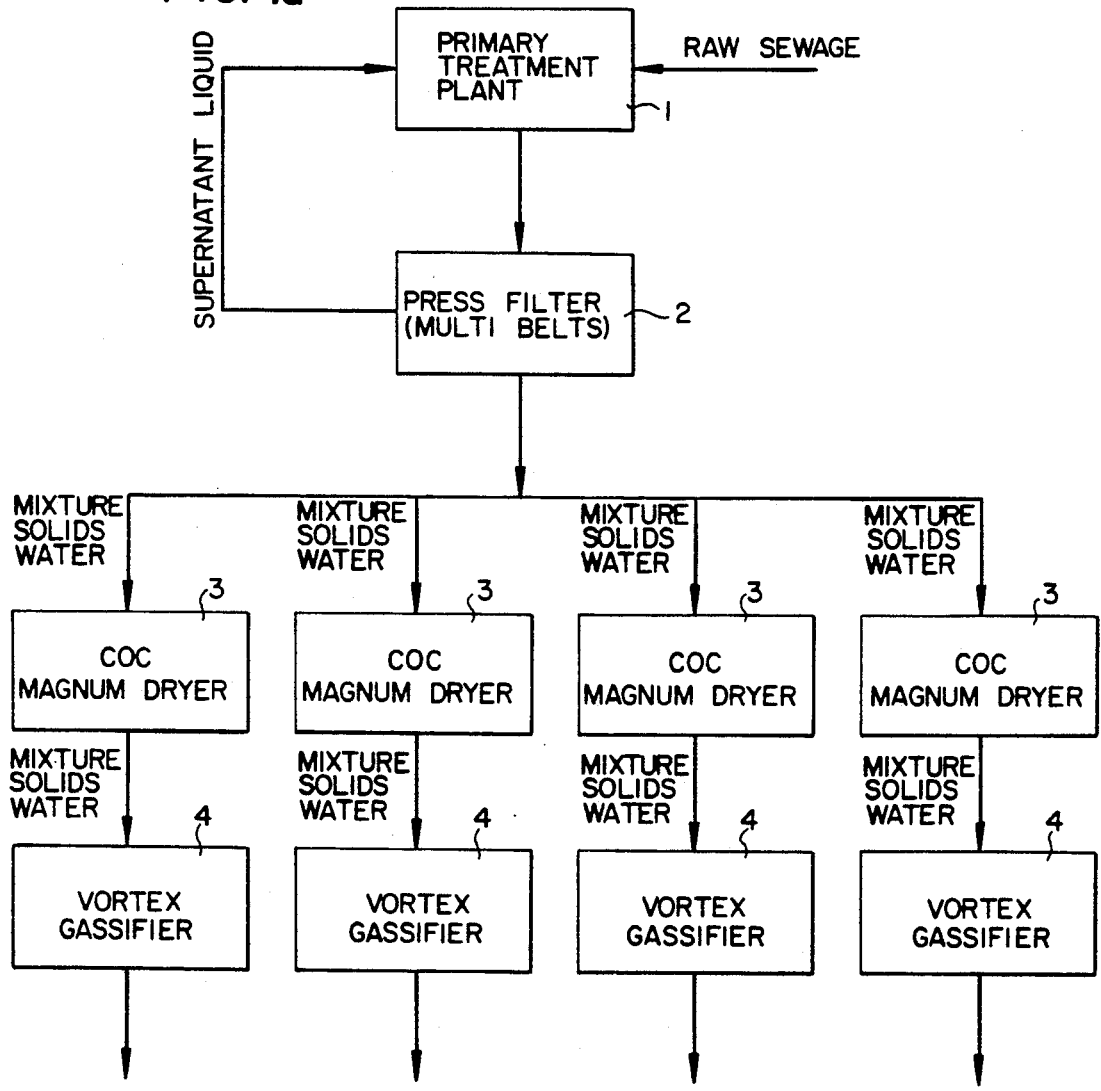
FIG. 1a is a flow chart depicting a waste disposal system in which vapor clarification according to the present invention is effected.

With regard to boxes 1 and 2 in FIG. 1a, the first step in the depicted process is to bring the material into the primary treatment plant and prepare (precondition) the waste material to ensure that it is at a suitable temperature and moisture level, and is free from excess particulate matter, before entering the drying process (box 3). This initial step can include, for example, running the waste material through a belt press-type filter 5, or any other type of mechanical dewatering device, and a scrubber 6 to remove and sterilize any supernatant liquid prior to conveying the waste material to the dryer.

Figure 1B:
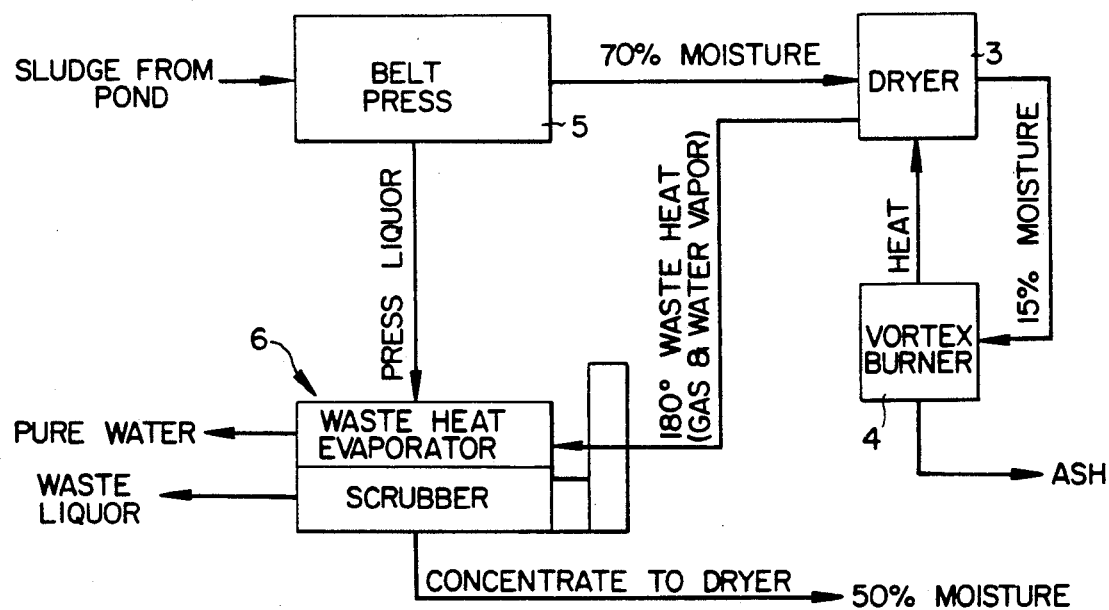
FIG. 1b is a flow chart depicting a belt press and waste heat evaporator used in conjunction with the present invention to prepare materials having an extremely high moisture content.

This type of preconditioning is particularly useful in treating waste material having an extremely high moisture content, such as pond sludge. As shown in FIG. 1b, waste heat from the dryer (3) can be used in the waste heat evaporator and scrubber system 6. The waste heat evaporator is used to reduce the volume of contaminated press liquor from the waste materials. The product produced by the evaporator is referred to as a waste concentrate. This material typically comprises 50–75% soluble solids and can be disposed of in several ways, one of which is by mixing it with the solid materials, otherwise known as press cake, discharged from the press filter. This mixture of materials typically forms the waste material that is dried and incinerated in the manner discussed in detail below. Energy for the waste heat evaporator is supplied by the vapor returned from the dryer.

Vapor returned from the dryer is scrubbed in a plurality of scrubber units which each comprise two scrubber sections and a system of vapor ducts which supply and withdraw vapor from the scrubber units. As shown in FIG. 1c, vapor leaving the stack 107 (FIGS. 2 and 3) of the system enters each scrubber section 10 at inlet 11, where it is saturated with water supplied at inlet 12 to remove particulate matter and condensed water. The particulate matter and condensed water exit each scrubber section at outlet 13, and are conveyed to a holding tank 14 where it is mixed with additional water and then conveyed to a settling pond. A portion of the hot water from the holding tank 14 is pumped out of the holding tank through a heat exchanger 15 where it heats the waste material entering the belt press 5. This heating of the waste materials entering the belt press allows for better dewatering within the press. Next, water leaving the heat exchanger 15 is then pumped to inlet 12 of scrubber section 10 where it saturates the vapor which is introduced at inlet 11. Clean saturated vapor leaves the top of scrubber section 10 at outlet 16 and is conveyed to the evaporator or to the atmosphere. The portion of the vapor duct system within the scrubber unit which is located near to the evaporator is provided with spraying nozzles which spray the interior surfaces of the ducts to keep particulates from accumulating on these surfaces. This particular embodiment is very energy-efficient because it not only utilizes the waste heat from the dryer 3 but also generates additional waste concentrate to be processed.

Figure 1D:
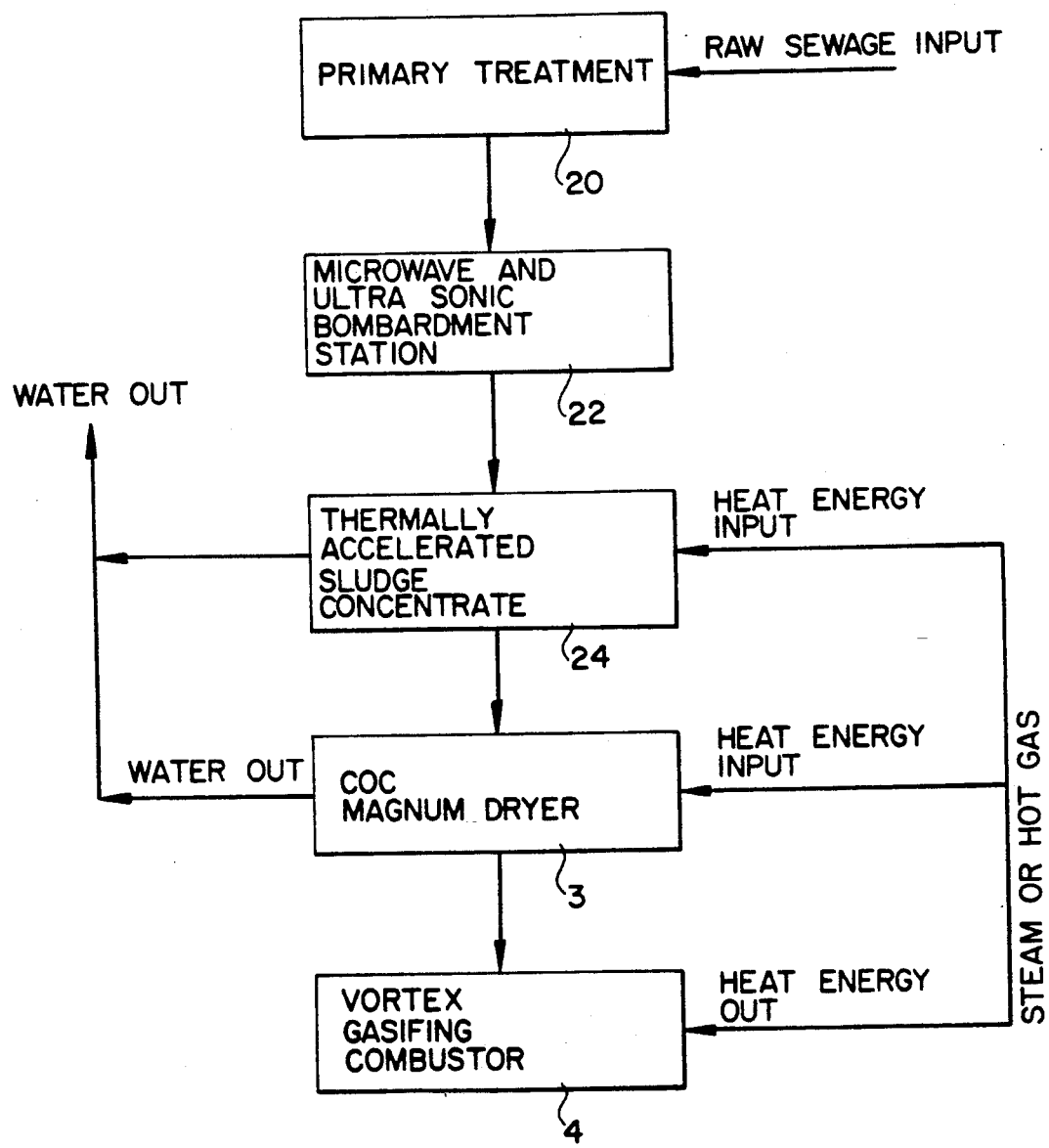
FIG. 1d is a flow chart depicting a waste disposal system that incorporates an embodiment of the present invention.

In the embodiment shown in FIG. 1d, boxes 20–24, waste materials that have a high metal content or otherwise require a higher combustion temperature undergo primary treatment such as microwave and ultrasonic bombardment at station 22, such that the solid waste particles are preconditioned enabling said waste particles to liberate bound water when thermally activated thus improving the efficiency of the system in producing the desired end point moisture level.

Figure 5:
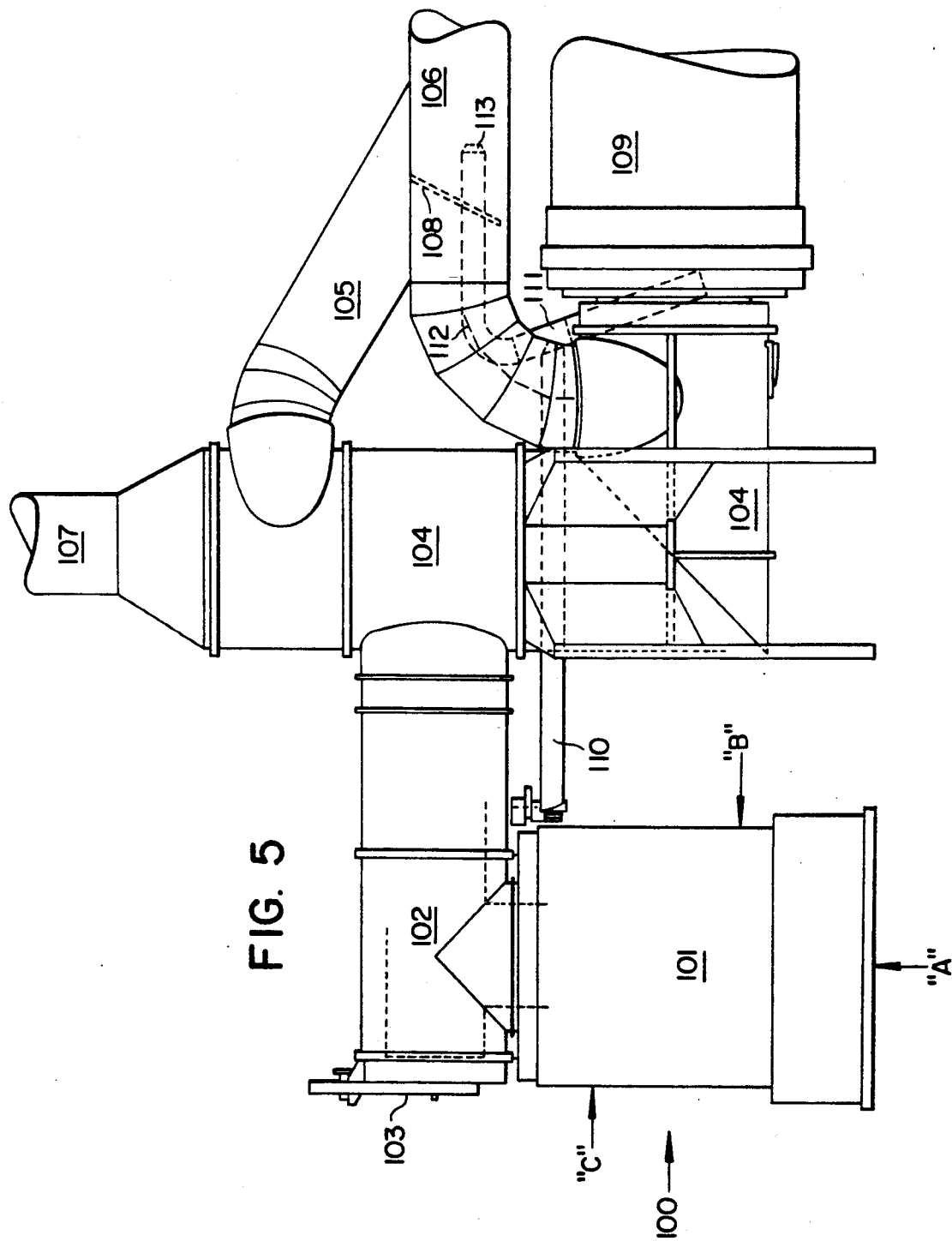
FIG. 5 is a front view of the burner used in the waste disposal system of FIGS. 2-5.
Figure 6:
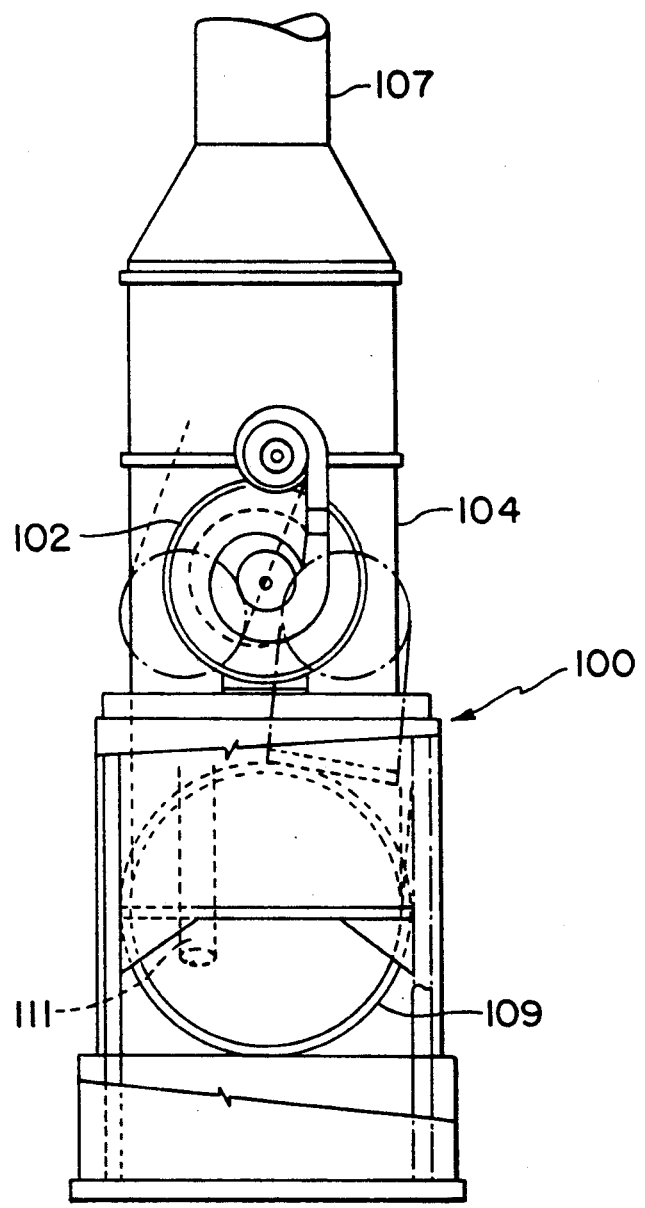
FIG. 6 is a sectional view of the burner of FIG. 5.

As shown in FIG. 5, after the waste material has been preconditioned in belt filter presses or other preconditioning stages, raw feed auger 110 receives the wet waste material from the belt filter presses and conveys it to dryer feed tube 111. Dryer feed tube 111 is connected to recycle tube 112 which attaches to the recycle conduit 106 at 113. Recycle gasses are thus push-pulled through feed tube 111, cleaning the internal surface of the feed tube and, thereby, avoiding particle buildup and eventual stoppage.

Figure 4:
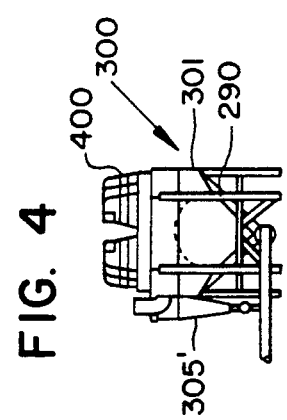
FIG. 4 is an end view of the waste disposal system of FIG. 2.
Figure 2:
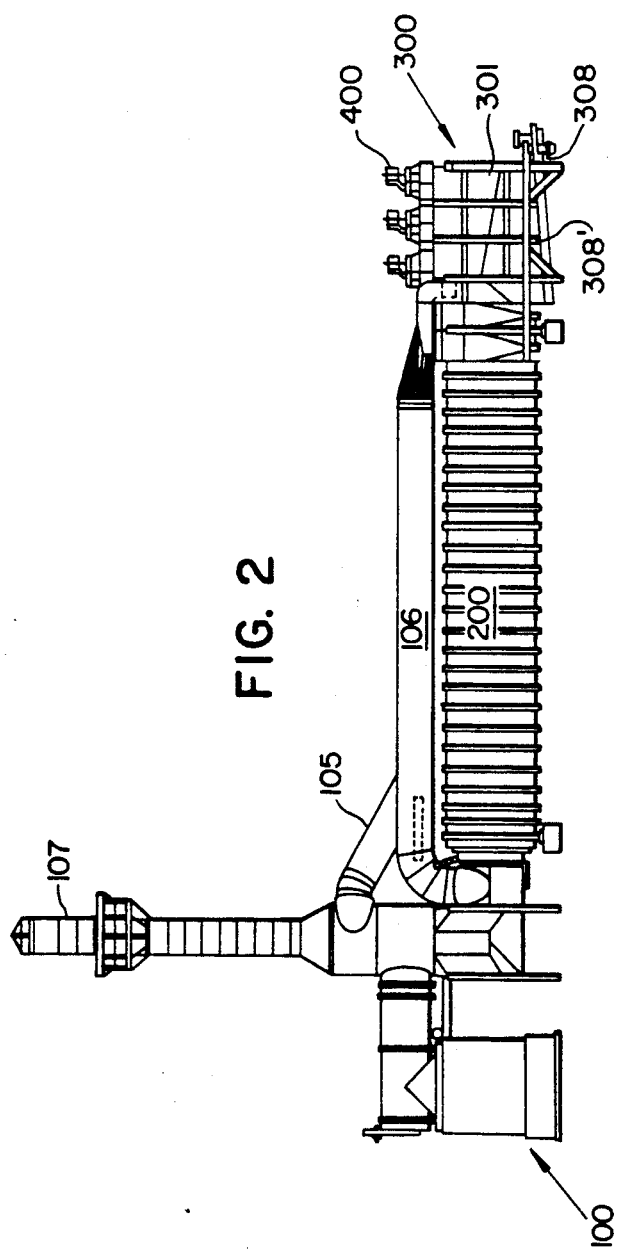
FIG. 2 is a side view of the waste disposal system including a preferred embodiment of the vapor clarification system of the present invention.
Figure 3:
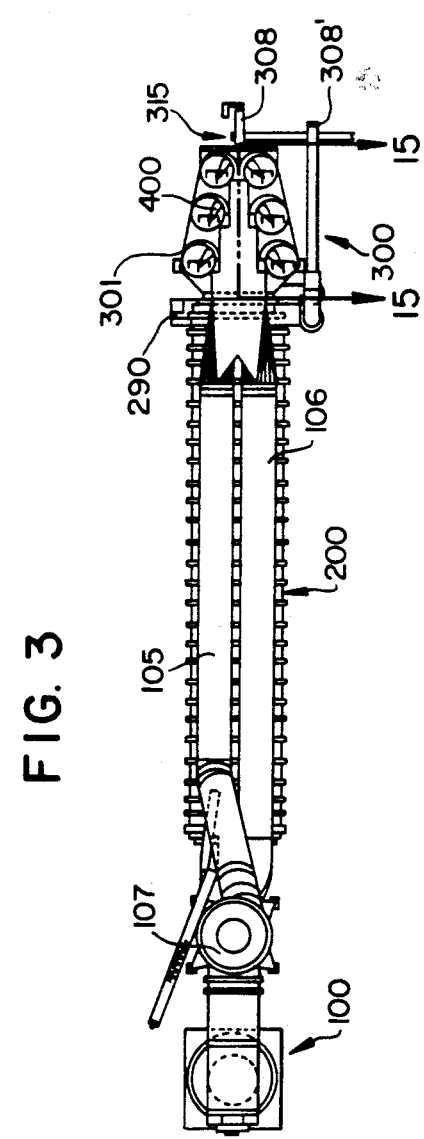
FIG. 3 is a top view of the waste disposal system of FIG. 2.

As shown in FIGS. 2–4, preconditioned materials are conveyed into the primary conditioning system at the feed entry 109. The primary conditioning system includes a dryer assembly 200, a vapor clarification system 300 which removes vapors from the dryer outlet, and a burner 100 which gassifies in conjunction with incinerating the materials exiting dryer 200 and mixes hot exhaust gasses with vapors transported by vapor clarification system 300 to produce the hot gasses constituting the drying media for the dryer 200.

The burner is used to gassify and incinerate the waste material after it is uniformly dried. Thermal disposal of the waste in this manner also generates energy which can be used in part in drying the sludge during preconditioning stage. As noted above, the exhaust gasses from the burner 100 are mixed with vapors recycled from the vapor clarification system 300 to produce a gas which is of a temperatures suitable for drying the material.

Many types of furnaces can accomplish the thermal disposal function. One such furnace employs a type of burner that effects complete combustion of even high moisture content fuels by providing, as needed, both primary and secondary incineration. Exemplary of this type of burner is the so-called "vortex gassifier combuster" (VGC) described in U.S. Pat. No. 4,574,711 (J. Vernon Christian), the contents of which are hereby incorporated by reference. The control circuit for the VGC includes thermo-sensitive means which establish a set point temperature for the furnace, measures the flue gas and furnace temperature and controls the delivery of fuel and combustion air to the combustion chamber of the VGC to ensure that the set point temperature is maintained thereby ensuring efficient combustion which reduces pollution and prevents excess fuel consumption. The set point temperature can be adjusted depending on the type of waste material to be gassified and incinerated in the VGC. Exemplary of this type of control circuit is the so-called "stokermaster" control circuit described in U.S. Pat. No. 4,517,902 (J. Vernon Christian), the contents of which are hereby incorporated by reference. This system takes into account the control parameters which affect efficient incineration of solid fuels, and calculates and maintains a set-point temperature at which the most efficient operation of a solid fuel burner is achieved.

In FIG. 5, component 100 is a VGC burner. After leaving the dryer, waste which has been dried to the predetermined moisture level enters the primary combustion chamber 101 of burner 100 at points A, B, or C or in any combination of these points. The hot flue gas (1600°-2300° F.) generated from the primary combustion of the waste material passes into a secondary combustion chamber 102 where the flue gas may be mixed, if further combustion is required, with flue gas generated from an auxiliary gas/oil burner 103. The heated flue gas then travels to a mixing chamber 104, where a two-step cooling process occurs. First, a combination of water vapor from the waste materials and cooler vapor drawn from dryer exhaust conduit 105 mixes with hot flue gas of the VGC burner. The cooler vapor can have a temperature between 165°-275° F., for example, although a higher temperature may be appropriate, depending on the type of waste material. Mixing of the cooler vapor and hot flue gas forms gasses which enter a feed entry conduit at a desirably reduced temperature range, for example, in a range of 600°-1400° F. Any excess flue gas which is not recycled to the mixing chamber is conveyed to discharge conduit 107 where oxidation of volatile materials takes place before the gas is discharged to the atmosphere.

Since the gasses are still too hot to come into direct contact with the waste material, recycle conduit 106 conveys the cooler recycled gasses from the fans to the feed entry conduit 109. The cooler recycled gasses then mix with the hot gasses from the mixing chamber to ensure that the gasses which enter the dryer 200 are at a lower temperature more suitable for drying the waste material. Recycle conduit 106 includes a damper 108 which limits the amount of cooler recycled gasses conveyed through recycle conduit 106, thereby ensuring that mixing chamber 104 is operating at less-than-atmospheric pressure, for example, around −0.25" W.C., creating a partial vacuum. This negative pressure in mixing chamber 104 prevents hot gasses from escaping through conduit 107 to the atmosphere, thereby ensuring that the maximum amount of hot gasses are recycled, thus enhancing the overall efficiency of the VGC burner.

In addition, the control circuit of the VGC discussed earlier also contains thermosensitive circuits which control the temperature of the gasses recycled through the dryer. The thermosensitive circuits measure the temperature of the dryer exhaust vapor in conduits 106 and 107 and adjust the amount of fuel being combusted by the VGC to control the moisture level of the vapor which ultimately controls the temperature of the flue gasses which mix with the cooler vapor for recycling through the dryer.

Figure 7:
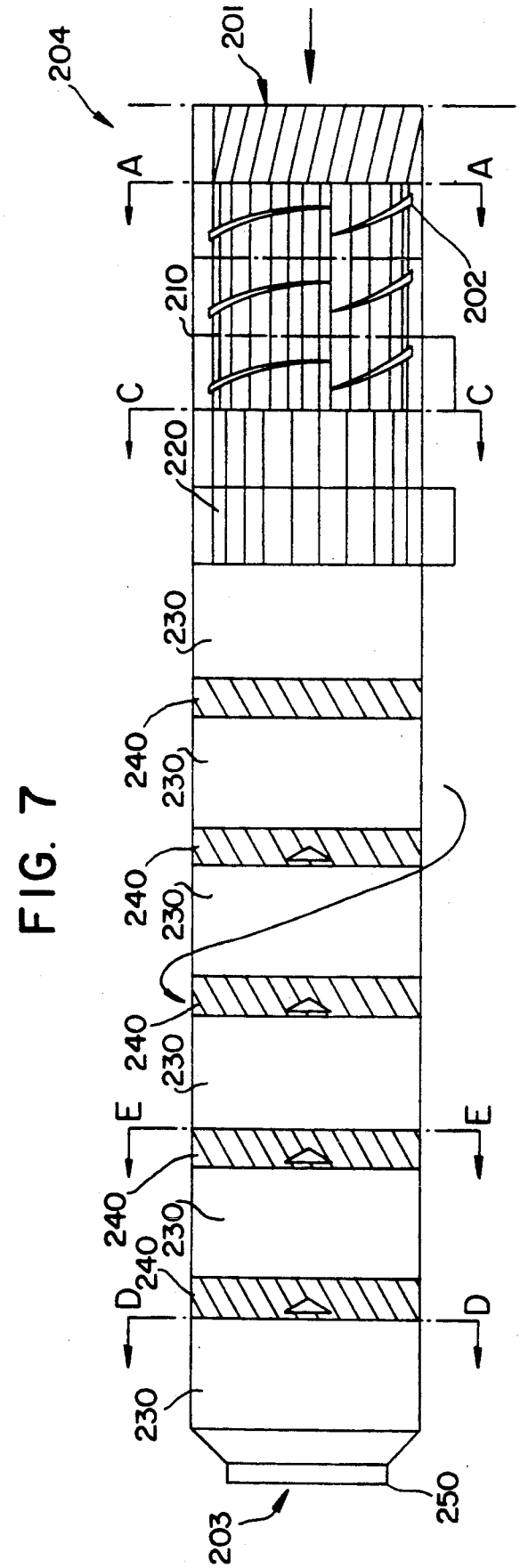
FIG. 7 is a partially schematic, cross-sectional side view of the dryer assembly of the waste disposal system of FIGS. 2-4.

With reference to FIG. 7, the high-moisture waste materials are conveyed through an inlet 201, of the dryer assembly 200 into a rotating dryer drum 201 where they are uniformly dried to a predetermined moisture level before leaving the dryer assembly at exit 203. The heat for drying the materials is supplied by the hot gasses which are produced by the furnace 100 and which also enter the dryer 200 at inlet 201. The dryer drum includes a feeder baffle section 204 which controls the feed rate of materials into the remaining dryer sections, a baffle section 210 in which the materials are preheated to achieve a more efficient drying operation, a distribution baffle section 220 which evenly distributes materials into the succeeding baffle sections, and a primary drying section comprising a plurality of heat transfer baffle sections 230 and recycle baffle sections 240. An outlet cone 250 is located at the outlet 203 of the dryer assembly.

Figure 8:
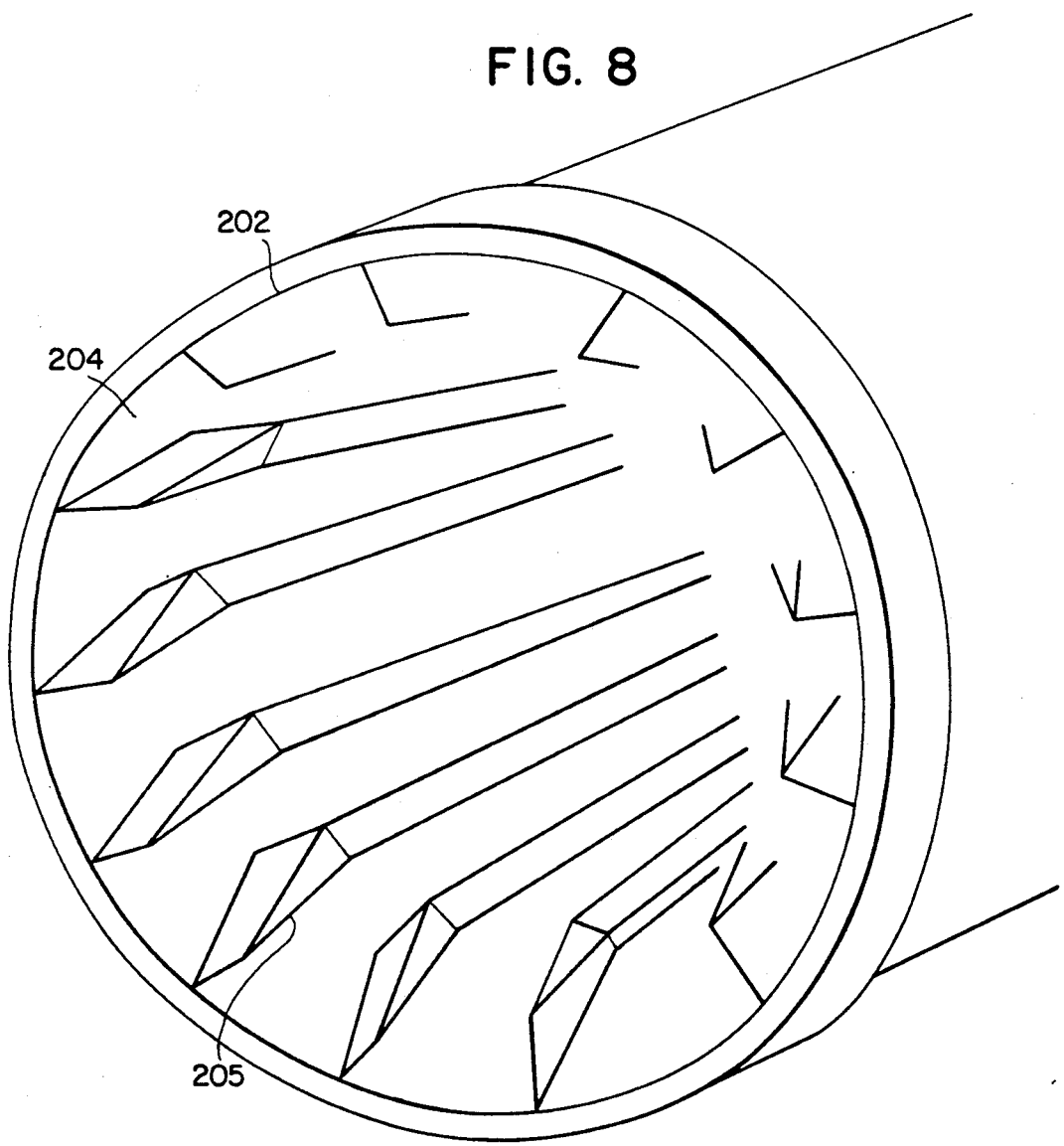
FIG. 8 is a perspective view of an end section of the feeder baffle section of the dryer assembly of FIG. 7.

As shown in FIG. 8, the feeder baffle section 204 is fitted with a plurality of paired infeed feeder vanes 205 which function to control the feed rate of materials to be dried to the inside of the baffle section 210. These paired vanes function to limit the amount of material fed into the baffle section 210 by cupping an optimal amount of material within the paired vanes 205 required for proper operation of the succeeding baffle sections. When material is fed into the dryer at a higher rate than the baffle section 210 can accommodate, the result is a back-up of materials in the paired feeder vanes 205, and the excess materials spill over the cup formed by the feeder vanes. When the flow rate of materials into the dryer decreases, the excess materials is again cupped by the feeder vanes and fed to the baffle section 210. This operation ensures that material volume is evenly distributed throughout the dryer, effecting a more uniform drying operation.

A system of the present invention can be adapted to condition different materials by varying the number of infeed baffles installed in a given drum radius. The number of baffles to be installed will depend on the moisture-level of the materials being conditioned, the percentage of combustible elements in the materials, and the adhesion coefficient of the materials on the baffles 205. For example, inbound materials containing 83% moisture and having a small coefficient of adhesion would require 36 baffles, covering 1% of the dryer length, and materials containing 25% moisture and having a high coefficient of adhesion would require 20 baffles covering 10% of the dryer length. The size of the drum 202 can be varied in proportion to the volume of material that is to be conditioned in a given time period.

Figure 9:
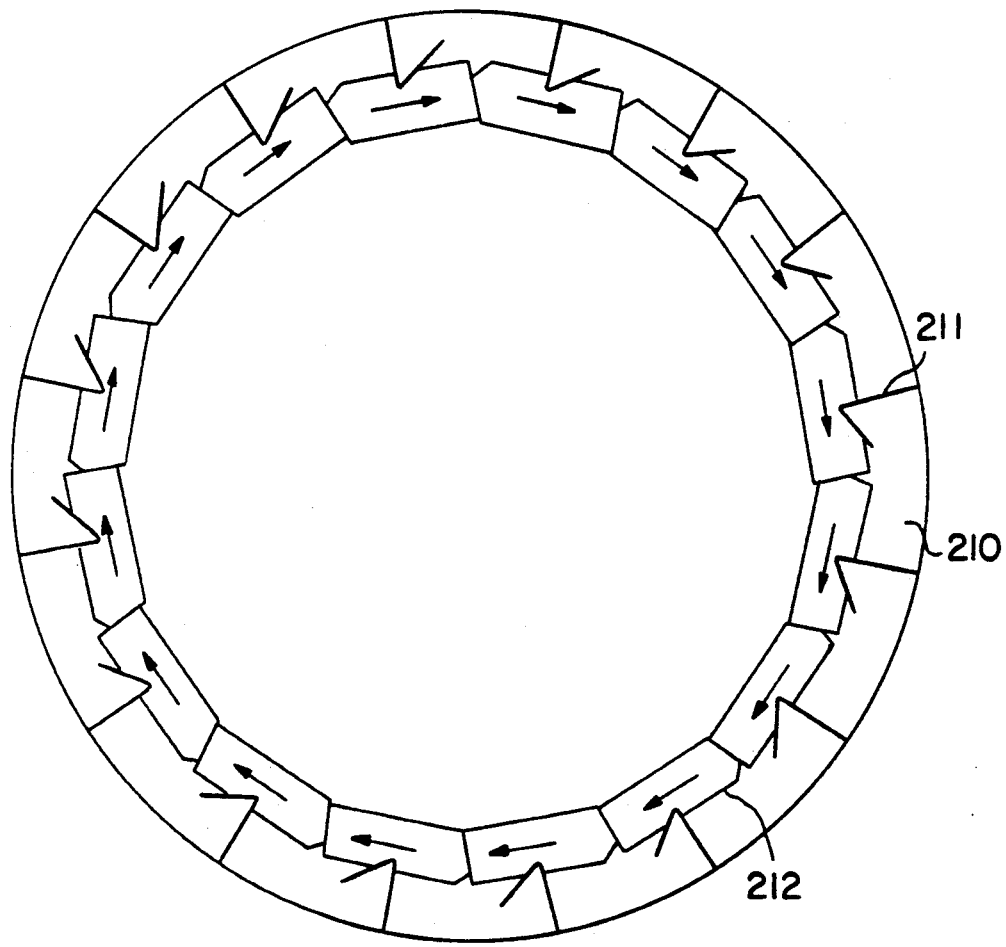
FIG. 9 is a sectional view taken along line a—a of FIG. 7.

Materials exiting the feeder baffle section 205 are conveyed into the baffle section 210 where they are preheated to a temperature at which efficient drying can be performed. The materials are preheated in this section by the combination of indirect heat transfer from the hot gasses and the heat from the surface area of the baffle sections. With reference to FIG. 9, the individual baffles of the section 210 are constructed with a cupping design 211 to enclose the materials and to protect them from the hot furnace gasses flowing through the center of the drum. This cupping action is necessary in light of the fact that the gasses entering the drum are generally hot enough to burn materials on contact. Such a premature combustion of the materials would create undesirable air-borne particulates. But the heat transfer which takes place within this section cools the gasses leaving the section to a point where they can contact the materials without effecting combustion.

These baffles 210 each have external feed accelerators 212 for rapidly transferring to the next section any materials that bypass the feeder baffle section or that cannot be accommodated by the cupping design due to a temporary overload condition. These accelerators 212 rapidly pass the materials to the downstream baffles without dropping them through the hot gasses.

The number of baffles in the baffle section 210 will be varied as a function of the heat transfer properties of the waste materials, the amount of combustibles in the materials, the amount of preheating needed to release water in succeeding dryer sections, the flow rate of material into the dryer assembly, and drum size, among other variables. For example, with the drum sized for an appropriate throughput, waste materials having a 25% moisture level and an ambient temperature of 75° F., would require 12 baffles and a preheat section of 18% of the dryer length.

Figure 10:
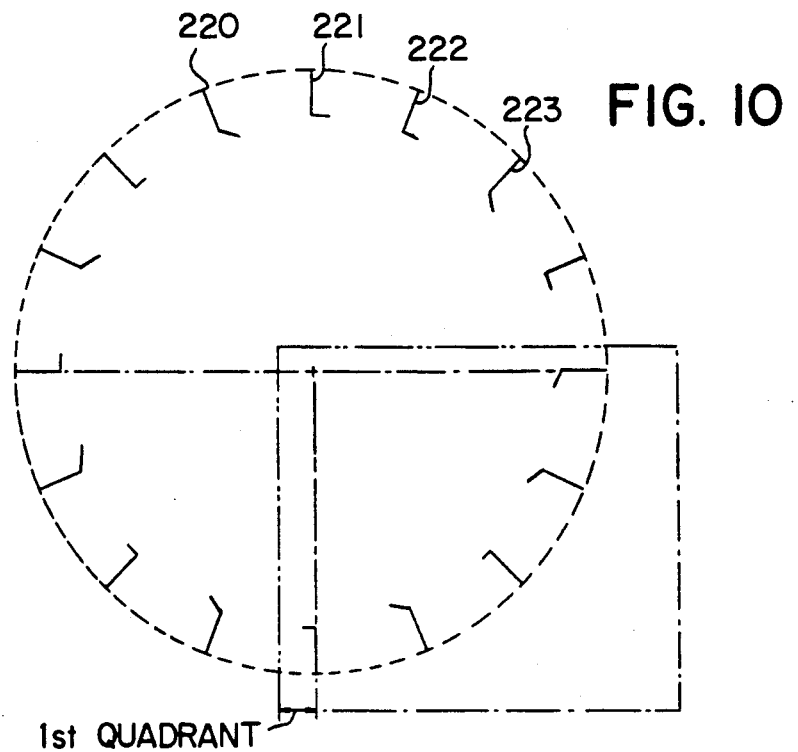
FIG. 10 is a sectional view taken along line c—c of FIG. 7.
Figure 11:
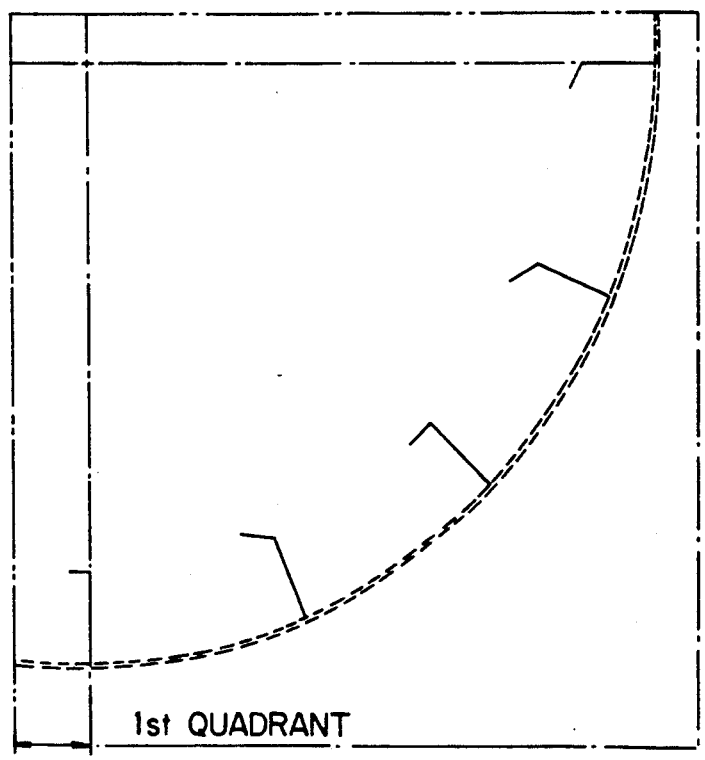
FIG. 11 is an enlarged view of a portion of FIG. 10.

As shown in FIG. 7, the materials exiting baffle section 210 next enter distribution baffle section 220, which functions to evenly distribute materials into the downstream baffle section 230. This section includes a plurality of lifter baffles designed to distribute the materials uniformly through the hot gasses and onto the heat transfer baffles 230. In FIG. 10, the lifter baffles 221, 222, 223, of each distribution baffle section 220 extend radially from the outer perimeter of the drum and are of three progressively increasing angles which release the materials at different points in a given rotation cycle of the drum 201. Air circulation within the drum then evenly distributes the materials into the next section 230 for heat transfer with the hot gasses, thereby ensuring a more uniform drying operation. The lifting and dropping action of these baffles 221, 222, 223 also functions to break apart any large clumps of material before they enter the first of the heat transfer sections 230.

The length of the baffle section 210 can be varied by changing the number of baffle sections placed in the distribution section. For example, materials having an inbound moisture level of 83% and a medium coefficient of adhesion would require a distribution baffle section covering 38% of the dryer length. Materials having an inbound moisture level of 83% and a low coefficient of adhesion would require a distribution baffle section covering 25% of the dryer length. It is desirable to vary the length of this section in dependence on material properties to provide optimum distribution of materials. For example, because a primary purpose of this section is to expose the materials to sufficient air flow to move them to the next section and to break up any aggregated product, the length of the distribution baffle section 210 will have to be increased as the density and/or the volume of material increases.

The materials exiting the distribution baffle section 220 in FIG. 7 are uniformly distributed onto the first baffle section of a primary drying section in which the materials are uniformly dried to the predetermined moisture level. The primary drying section includes a series of alternating heat transfer baffle sections 230 and recycle baffle sections 240. The last heat transfer baffle section 230 opens into the dryer drum exit 203 via velocity cone 250. The construction and function of one of each of the individual baffle sections 230 and 240 will be discussed in detail below.

The heat transfer baffle sections 230 are designed to provide uniform drying of materials. Each section includes a plurality of baffles specifically designed for high heat recovery from the hot gasses produced by the furnace. It should be noted that the hot gasses exiting the dryer assembly are properly categorized as vapors, since they have absorbed substantial amounts of moisture from the materials by the time they exit the last of the baffle sections.

Figure 12:
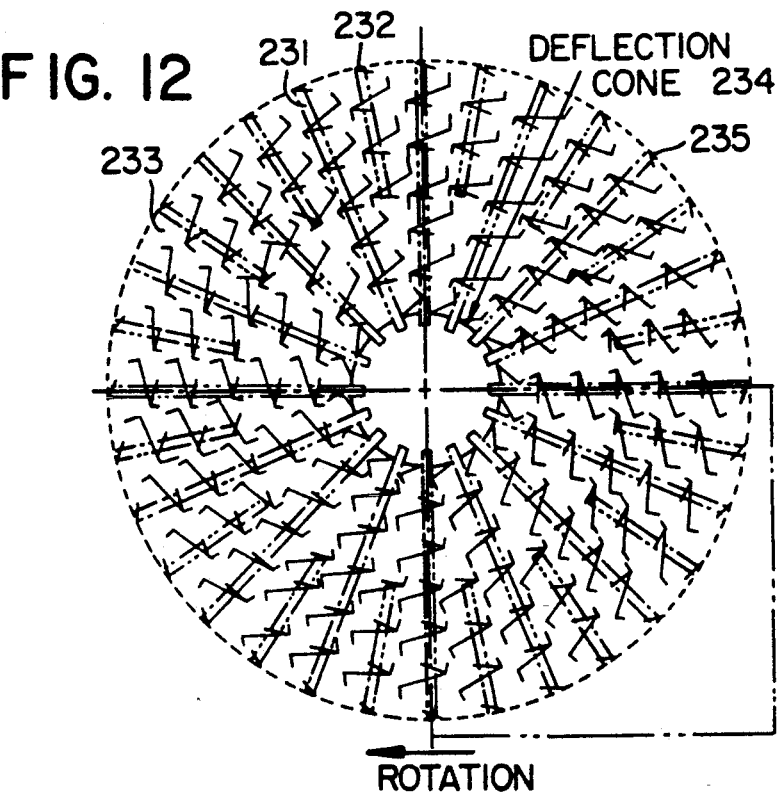
FIG. 12 is a sectional view taken along line d—d of FIG. 7.
Figure 13:
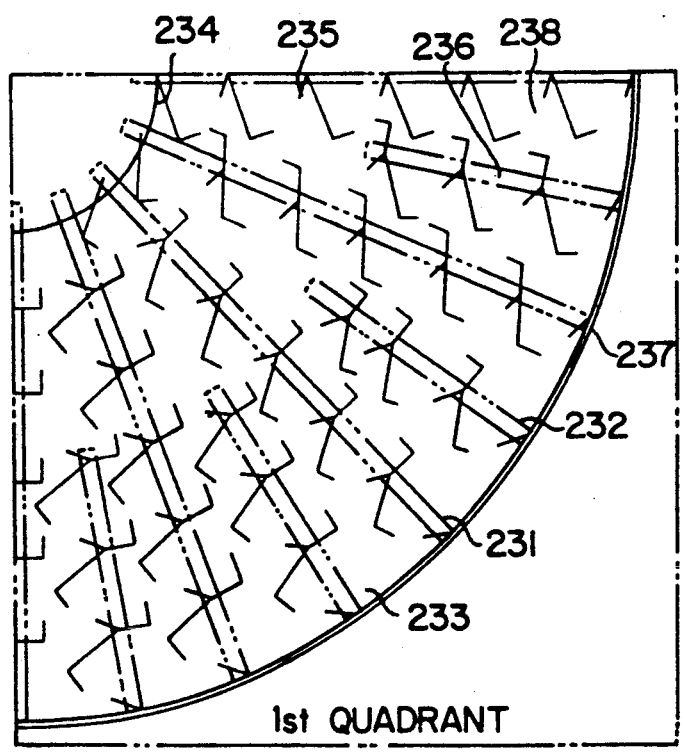
FIG. 13 is an enlarged view of a portion of FIG. 12.

As shown in FIGS. 12 and 13, each of these heat transfer baffle sections 230 comprise a plurality of alternating primary and secondary baffle support bars 231 and 232 extending radially inwardly from the outer perimeter of the drum and a plurality of polyhedral baffles 235 supported on each support bar. To maintain sufficient baffle surface to cross sectional areas at all portions of the drum diameter, the lengths of the secondary support bars 232 are approximately one half that of the primary support bars 231. Each of the support bars is attached on a flat bar backup plate 233. This backup plate also serves to suppress the flow of gasses through the dryer to maintain gas flow rates at the desired level. A deflector cone 234 is located at the center of the baffle section 230 to further suppress the flow of gasses through the dryer.

The support bars 231 and 232 form right angle baffles, and the polyhedral baffles 235 each have traps 236, 237, and 238, which extend at respective angles of 60 degrees, 70 degrees, and 90 degrees from the support bars on which they are attached. The traps 236, 237, and 238 enclose the materials so as to form miniature "drums" in which the material in each trap is independently dried. Clearance between the individual traps of each polyhedral baffle 235 and the corresponding right-angle baffle formed by the corresponding support bar 231 or 232 is designed to retain materials in each baffle section 230 until they are light enough to be moved by the vapor stream. This section also functions to break apart any aggregations of materials to increase material quality and to improve heat exchange efficiency.

The length of the individual baffle sections 230 can be varied based on the amount of energy required to evaporate the moisture in the materials to the predetermined level. Factors which influence the required length of the respective baffle sections include the temperature of the materials entering the section, the amount of surface contact between the hot gasses and the material, the heat exchange coefficient of the materials, and the ability of the baffles to break apart the materials and the resulting surface area of the materials. The required length of these sections will also vary with the moisture content of the inbound materials, which will vary with dryer drum size.

Figure 14:
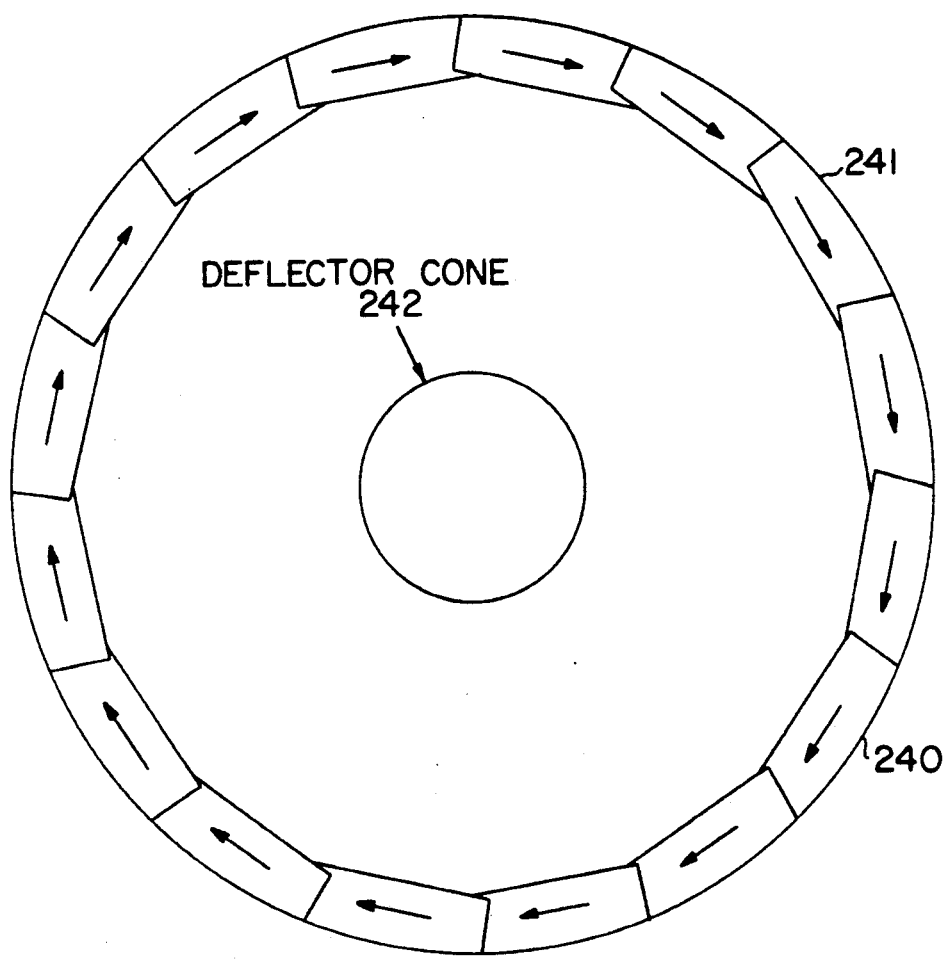
FIG. 14 is a sectional view taken along lines e—e of FIG. 7.

With reference again to FIG. 7, materials exiting the first of the heat transfer baffle sections 230 enter the first recycle baffle section 240. This baffle section 240 assures that the materials are uniformly dried by injecting high density materials, which are not yet dry enough to be conveyed by the gas flow, back into the first heat transfer baffle section 230 for further drying. The recycle baffle section 240 comprises a plurality of inverted return or back-step baffles, one of which is shown in FIG. 14. Each of these baffles comprise a 180 degree cup 241 on the dryer centerline side of the baffle section 240 to hold the materials during drum rotation and to shield the flow of materials which are being recycled from the dryer gas stream. The cup 241 is also tapered at a 30 degree angle to provide reverse acceleration of materials back into the first heat transfer baffle section 230. A deflector cone 242 is located at the center of the baffle section 240 to maintain gas flow rates at the desired level.

The angle of attack of the inverted baffles for each section 240 and their distance from the outer drum shell of each recycle baffle section 240 are matched to drum rotation velocity and material specific gravity. These variables determine the amount of reverse flow of materials that is required and, thus select the moisture content of the materials which leave the baffle section 240. The length of the individual baffle sections 240 can be varied in dependence on the size of the dryer drum, which, as previously mentioned, varies with the volume of material to be conditioned.

The materials continue to travel from section to section where they are progressively dried until they reach the velocity cone 250, located at the center of the exit 203 of the drum 201, which controls the flow rate of exiting materials and insures that only dried materials exit the dryer assembly. The velocity cone 250 has a 5 to 1 base to altitude ratio to reduce the air velocity through the open cone section, thereby controlling the flow rate of the dry materials. It also deflects any small sized particles that are being carried by the vapor stream back into the heat transfer baffle section 230. This ensures that material exiting the dryer assembly is carried by the vapor flow by virtue of its low specific gravity, brought about by a low moisture content, rather than simply its small particle size. The velocity cone 250 thus provides a final assurance that all of the materials exiting the dryer assembly 200 have reached the predetermined moisture level.

By changing the numbers of alternating heat transfer baffle sections 230 and recycle baffle sections 240, the dryer 200 can be readily modified to dry a variety of materials to different moisture levels. In addition, the amount of preheating performed in baffle section 210 and material distribution performed in section 220 is modifiable simply by changing the number of baffle sections 210 and 220. In addition, the individual baffle sections can be replaced by sections specifically designed for a given application, the design considerations for which were discussed above. A given dryer assembly thus can be quickly and easily modified to perform a wide variety of drying and conditioning operations.

In FIGS. 2 and 3, dried materials exiting dryer 200 are conveyed to furnace 100 via a conveyor 315, where they are incinerated as discussed above. The conveyor also communicates with the vapor clarification system 300 via conveyors 308 and 308i, which withdraws the vapors from the dryer and clarifies and recycles the vapors.

Both the hot gasses used to dry the waste material and the particulate emissions from the dryer discharge stack preferably satisfy applicable air quality regulations relating to federal air regulation standards. Accordingly a vapor clarification system, shown generally at 300 (see FIGS. 3, 4 and 17-19), is attached to an outlet duct 290 of the dryer assembly 200. These fans are multi-purpose in that they draw hot, moisture-laden vapor through the dryer assembly, separate the particulate contamination from this vapor stream, and pump the cleaned, recycled vapor stream back to the VGC burner via dryer exhaust conduit 105 and recycle conduit 106 (FIG. 3). Although various types of dust control/fan systems can accomplish the recycling/separating function, a dust control system constructed in accordance with the present invention is preferably used which accelerates incoming vapor streams to centrifugally separate particulate matter from the vapor stream. Because the fans are operating at the same temperature as the dryer exhaust vapor, there is no condensation and no accumulation of water vapor. The fans thus assure that vapor entering exhaust stack 107 (FIGS. 2 and 3) is free of condensed water.

Figure 16:
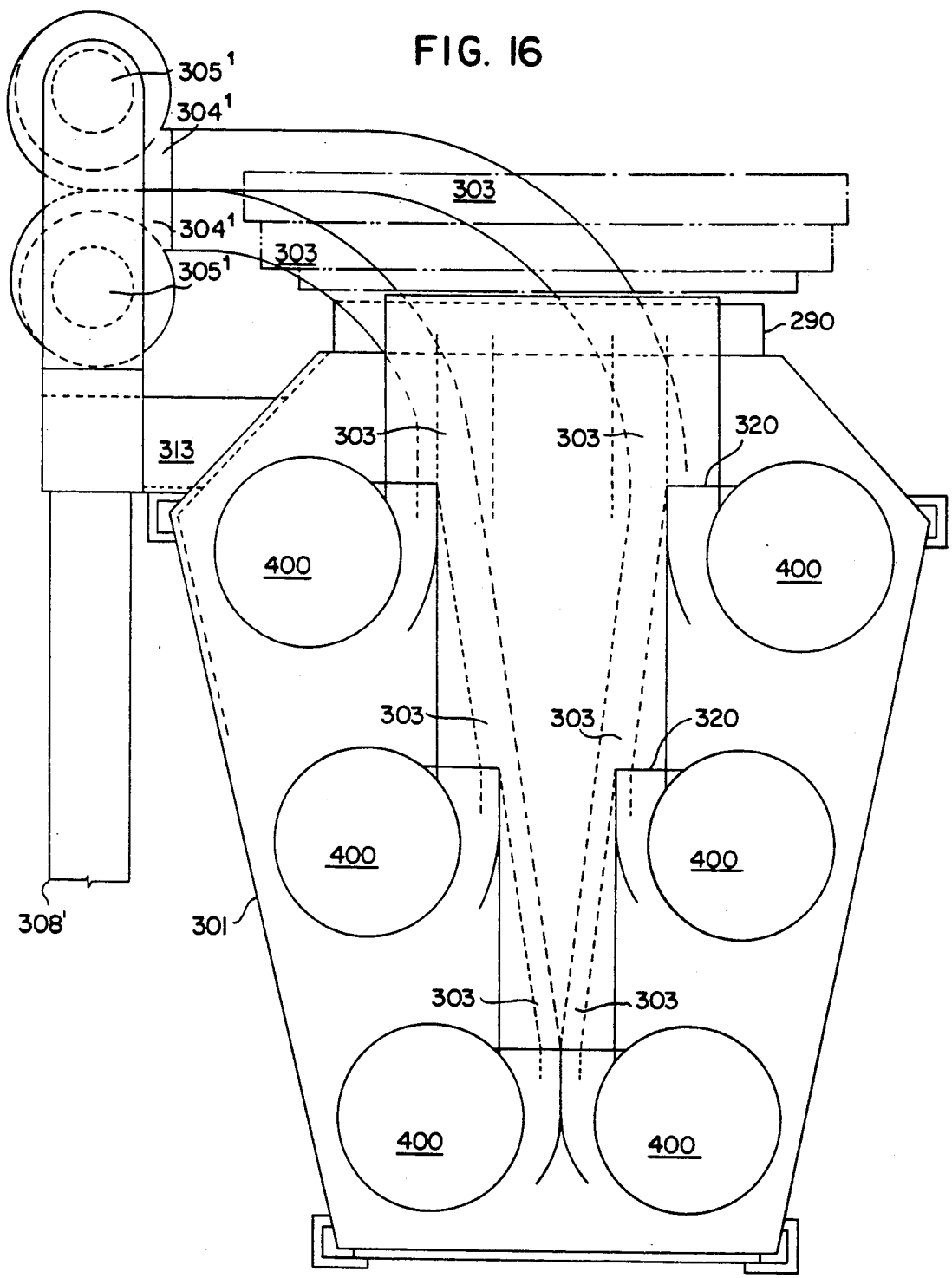
FIG. 16 is a top view of the vapor clarification assembly of FIG. 15.
Figure 17:
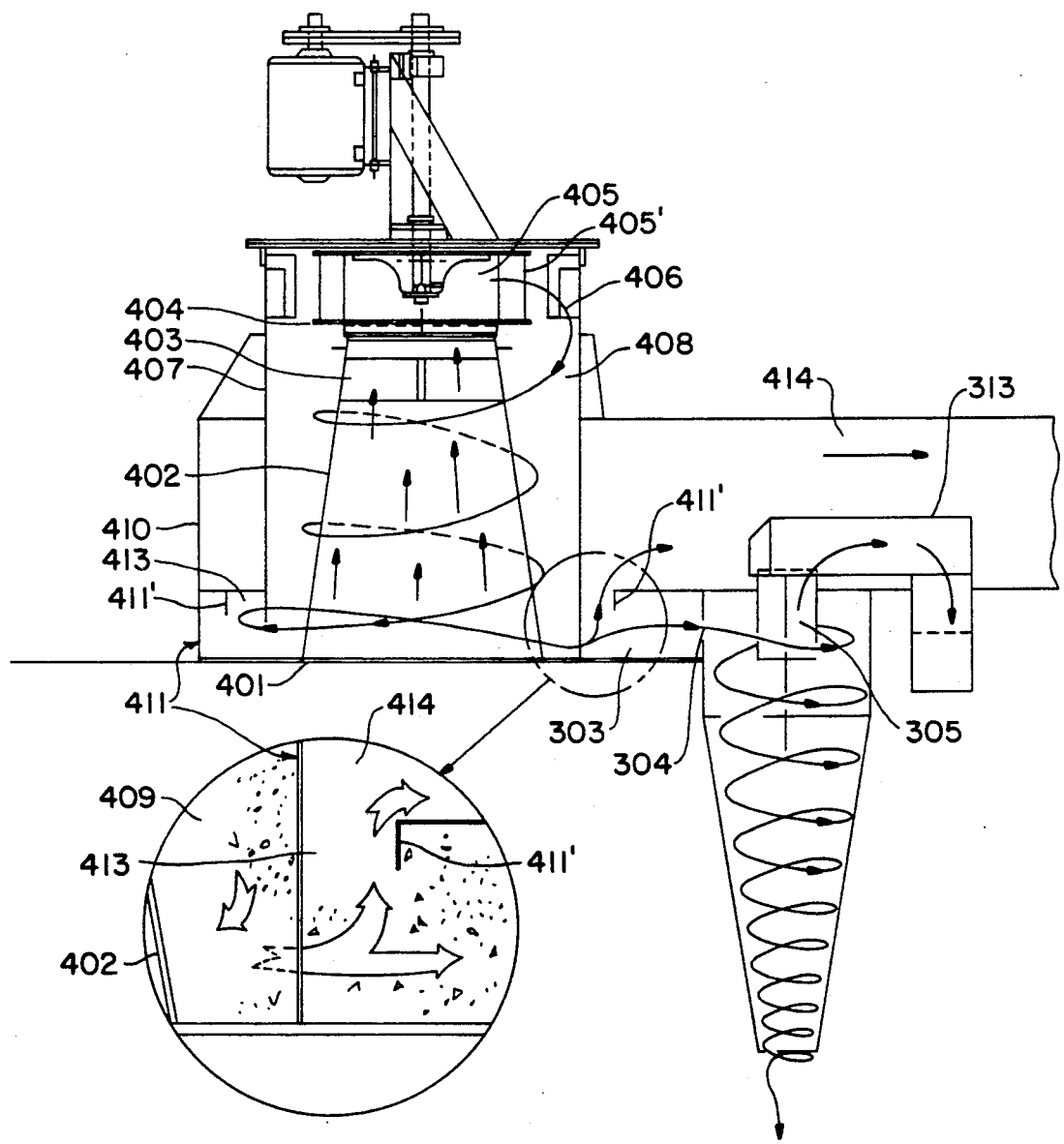
FIG. 17 is a sectional side view of fan illustrated in FIG. 15.

As shown in FIGS. 16 and 17, suction box 301 is the focal point of the vapor clarification system 300. The Magnum Fans 400 are located in the roof of the suction box 301 (see FIG. 16). The number of fans is determined by the drying capacity of the dryer. A detailed description of the fan structure will follow. The hot vapors withdrawn from the dryer are subjected to a two-tier clarification process before being recycled.

Figure 15:
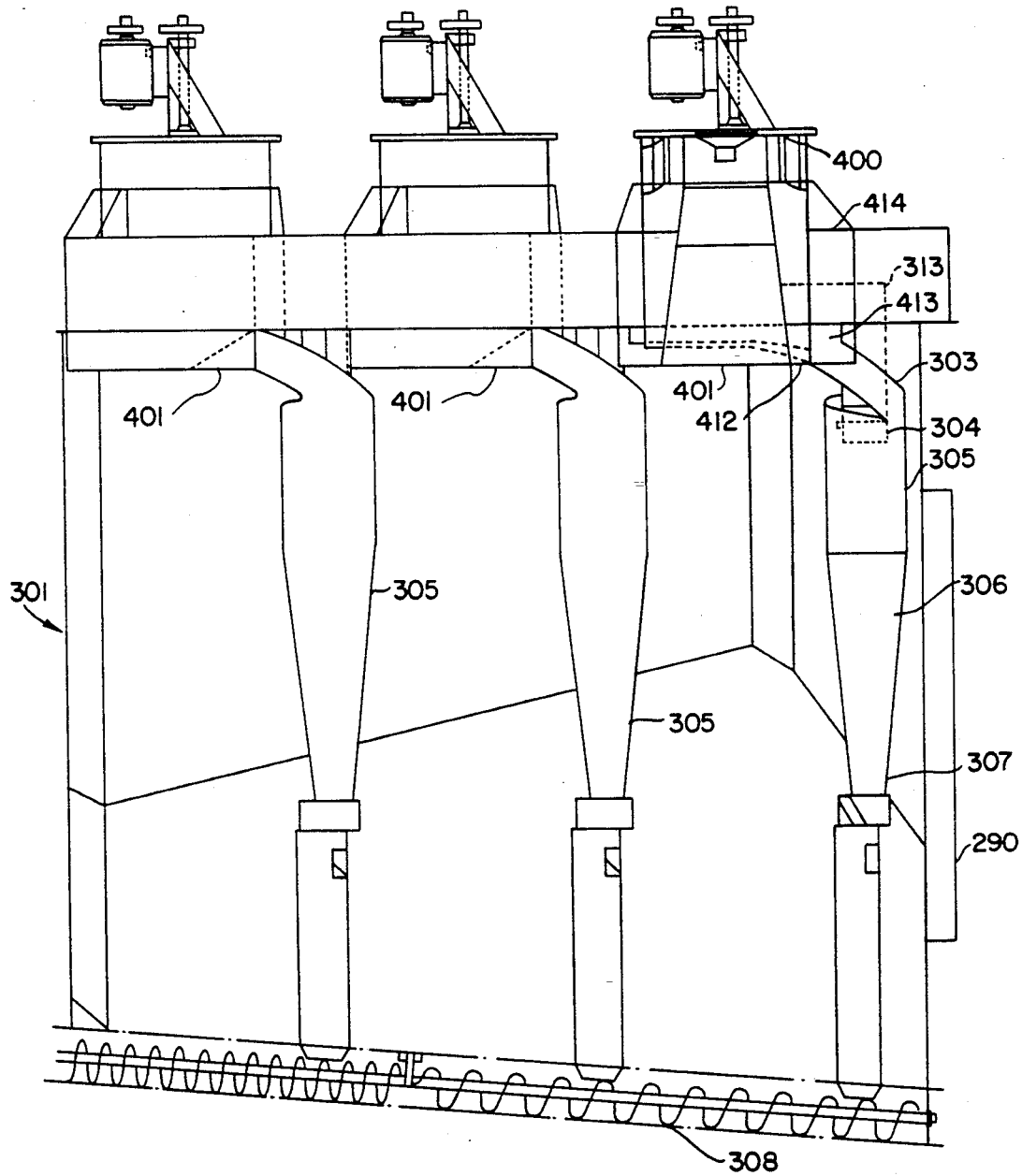
FIG. 15 is a sectional view of a suction box and fan assembly of a vapor clarification system taken along line 15—15 in FIG. 3 and showing one of the fans of the clarification system in partial cross-section.

As shown in FIGS. 15-17, each of the Magnum Fans 400 is situated on top of suction box 301 to allow the suction box to lower the velocity of the vapor so that heavier material in the dryer drum falls out of the vapor stream, to be removed by primary evacuating auger 308, which also receive material from the dryer (see FIG. 3). Each fan 400 includes a conical shaped inlet portion 401 which tapers towards the outlet thereof which communicates with impeller inlet 404. The conical shape of this inlet portion 401 increases the velocity of the incoming vapor stream to a level sufficient to centrifugally remove heavier particulate matter from the stream while preventing the collection of particulate matter on the sides or bottom of the inlet portion 401.

The suction box 301 is designed for supporting the load of the fans 400, to support and enclose primary cyclones 305, and to support exterior secondary cyclones 305'. The secondary cyclones 305' are used in systems that require more stream clarification than can be achieved by the interior primary cyclones 305. By enclosing the primary cyclones 305 within the suction box 301, the temperature of the vapor entering the cyclones remains hot, thereby preventing a temperature differential that would lead to condensation. Such condensation is undesirable, as particulate matter in the vapor stream would adhere to the condensed moisture on the internal surfaces of the system. This particulate matter would at least partially block the internal ducts of the system, thus reducing its operational efficiency. The amount of condensation in the secondary cyclones 305' is also reduced by placing the fans on top of the suction box 301 which ensures that the vapor stream entering cyclones 305' from fans 400 is of a relatively high temperature. The structure and operation of the fan assembly and suction box, including the cyclones, will now be described with reference to FIGS. 15-20.

First, as illustrated by FIG. 16, the internal dust collection system of the suction box accelerates the vapor, withdrawn from the dryer assembly via inlet 290, and separates the vapor into a primary stream of clarified media and a secondary stream, the latter containing a high concentration of particulate matter. The primary stream which contains the clarified vapor is conveyed out of the fan to conduits 105 and 106. The secondary stream is discharged into conduit 303. Conduit 303 serves as a common manifold and leads to the entrance 304 of high-efficiency cyclone collectors 305 and 305'. The number of cyclone collectors in each system can be varied in accordance with the type of waste material being processed. The suction box 301 includes louvers 320, located on top of the suction box adjacent the fans, which control the velocity of the vapor stream, to cause fall-out of the large sized waste particulates removed from the dryer drum. These louvers are designed based on the consistency of the material being processed. The angle and coverage of the louvers will be changed to match material specifications.

Cyclones 305 and 305' further clarify the entering secondary stream by decelerating the secondary stream and causing the remaining particulate matter to fall to the lower portion 306 of the cyclones and into respective conveyors 308 and 308' (FIGS. 15 and 16). As seen in FIG. 15, the fallen particulate matter then exits the cyclones 305 at point 307 and enters a common auger conveyor 308. To maintain an effective seal at cyclone exit 307 into conveyor 308, the auger employs a full pitch auger. Without the seal on the bottom of the auger, some of the inbound vapor is lost through the bottom of the cyclone. Such a loss of vapor would result in a reduced volume, and thus a reduced velocity, of vapor in the cyclone, lowering the efficiency of the particulate removal operation. Thus, auger speed is regulated to maintain a particulate control level 311 in the up stream cyclone exit 307. Outside air is prevented from entering the negative pressure in the system by a positive seal created by the particulate matter itself and controlled by the speed of auger 308.

The clarified secondary stream now returns to the suction box 301 via conduit 313 (FIGS. 15 and 16). Any particulate matter remaining in the secondary stream is immediately recycled through the fans 400, as illustrated in FIGS. 15 and 16, where the above noted dust collecting cycle is repeated. The clarified secondary stream is then discharged from the vapor clarification system 300 and is conveyed to the front of the dryer assembly 200 via conduits 105 and 106. If desired, a portion of the vapors removed by vapor clarification system 300 can be supplied to the waste heat evaporator 6 via stack 107 (FIG. 1b-3) to perform the evaporation and scrubber operation.

Figure 18:
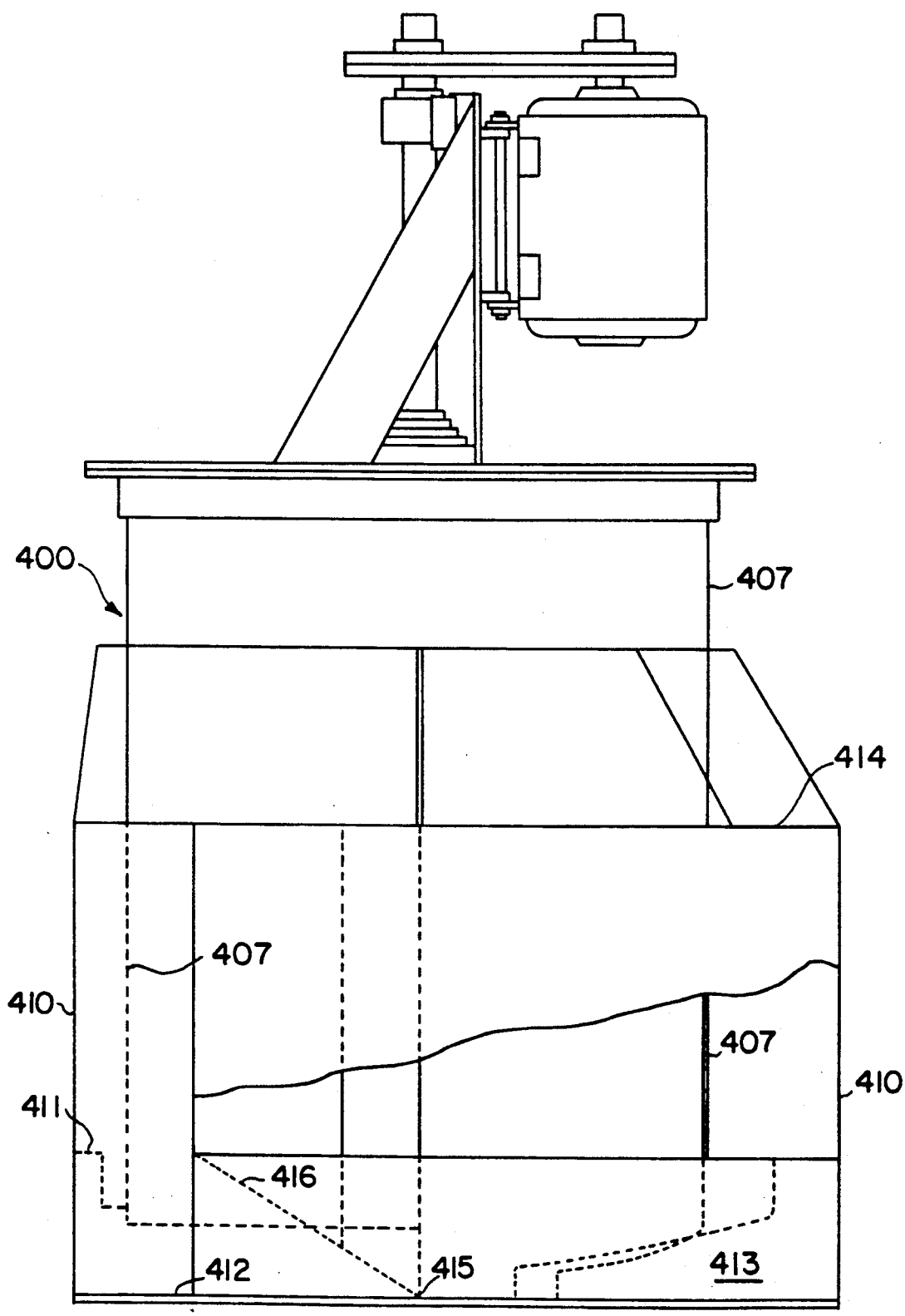
FIG. 18 is a partial sectional side view of the fan of FIG. 17 with the frame and motor removed for the sake of clarity.
Figure 19:
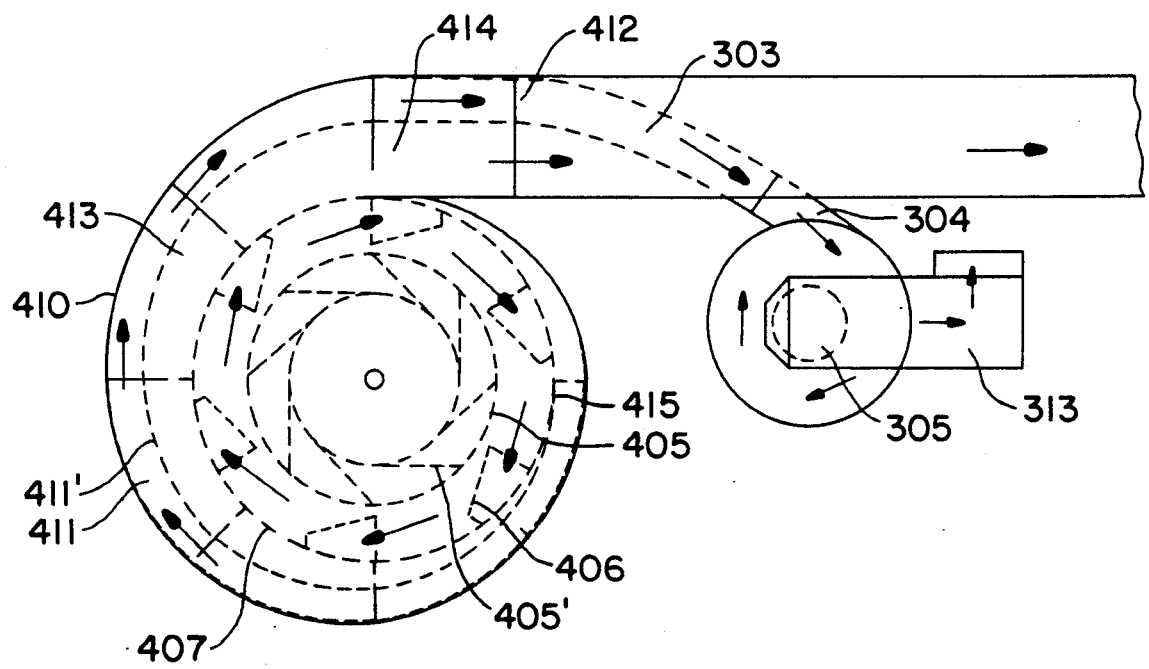
FIG. 19 is a top view of the fan of FIG. 17.

A more detailed description of the internal dust collection system of one of the fans 400 follows. As shown in FIG. 17, vapor heavily laden with particulate matter is drawn into the fan entry 401 from the interior of suction box 301 and is conveyed in a frusto-conical converging cone 402 toward a baffle 403 at the impeller inlet 404. As seen in FIGS. 17-19, an impeller 405 has several inclined blades 405' which extend away from the direction of rotation of the fan at an angle of 30 degrees from the exterior circumference of the fan. The impeller 405 imparts axial energy to the vapor and particulate matter, directing the vapor and particulate matter to enter a series of accelerating chambers 406, mounted at about a 60° angle around the inside perimeter of the fan casing 407. Impeller 405 thus acts as a fan or fan means which draws vapor into the air clarifier formed by the magnum fan 400 and which supplies air to the accelerating chambers 406. The chambers 406 accelerate the vapor through a downwardly spiralling (centrifugal) motion. The vapor then leaves the accelerating chamber and enters separating chambers 408 (FIG. 17). The particulate matter is thus accelerated in chambers 406 and is then separated from the vapor by adhering to the inner fan casing wall 407. The downward spiraling vortex motion (centrifugal motion) thus produced by the chambers 406 conveys the vapor and particulate matter, now highly separated, through the separating chamber 408 and into the concentrating area 409. The concentrating area formed by the inner fan casing wall 407 and the converging cone 402 acts to re-accelerate the concentrated vapor and particulate matter. This re-acceleration ensures that the particulate matter will have sufficient momentum to impact tangentially against an inner scroll casing wall 410 of the fan 400. The inner and lower portion of the scroll walls 407 and 410 form a conduit with a directing vane 411 attached to the scroll wall 407. The directing vane 411 has a vertical leg which traps particulate matter in a horizontal conduit formed by the scroll wall 410 and vane 411. The conduit conveys particulate matter to the particulate exit 412 and thence into the inlet 304 of cyclone 305.

The directing vane 411 also forms an annulus with fan casing 407. This annulus allows the clarified vapor stream to rise into passageway 413. Passageway 413 becomes a conduit formed by scroll casing 410 and fan casing 407 whereby clarified vapor is conveyed to the fan clarified vapor exit 414. The heavier secondary vapor stream travels downwardly into the inlet conduit 303 and into inlet 304 of the cyclone 305 or 305', where it is clarified as previous discussed.

The funnel for the particulate matter exit 412 connected to inlet 304 of cyclone 305 begins at point 415 and ends at the exit 412. Point 415 is also the beginning of the inclined transition plate 416 that directs clarified vapor to the fan clarified vapor exit 414.

What is claimed is:
1. A system for clarifying moisture-laden vapor containing particulates, comprising:
   (A) a suction box connected to a source of said moisture-laden vapor; and
   (B) air clarifier means for removing a stream of said moisture-laden vapor from said suction box and for separating particulate matter from said moisture-laden vapor stream;
   said air clarifier means comprising
   (i) fan means for drawing said moisture-laden vapor stream into said air clarifier means,
   (ii) means for imparting a downwardly spiraling motion to said vapor stream after it is drawn through said fan means,
   (iii) means for compressing and accelerating said vapor stream as it travels in said downwardly spiraling motion,
   (iv) means for centrifugally separating said vapor stream into a clarified vapor stream which is generally free of particulates and a secondary vapor stream which is laden with particulates after it has been compressed and accelerated by said means (iii), and

(v) an outlet, connected to said means (iv), for removing said clarified vapor stream from said air clarifier means.

2. The system of claim 1, further comprising
a cyclone which is connected to an outlet of said air clarifier means, which receives said secondary vapor stream from said means (iv), and in which particulate matter including fine dust is removed from said secondary vapor stream and
a conduit which is connected to an outlet of said cyclone and which returns said secondary vapor stream to said suction box.

3. The system of claim 2, wherein said cyclone is located within said suction box.

4. The system of claim 2, wherein said cyclone is located outside of said suction box.

5. The system of claim 1, wherein
said fan means comprises a rotary impeller having an inlet connected to said suction box and an outlet connected to said means (ii), said rotary impeller imparting axial energy to said moisture-laden vapor stream, and
said means (ii) comprises a series of accelerating chambers which accelerate said moisture-laden vapor stream centrifugally, each of said accelerating chambers having an inlet connected to said outlet of said rotary impeller and an outlet connected to said means (iii).

6. The system of claim 5, further comprising a frusto-conical shaped inlet passage which connects said suction box to said rotary impeller and which narrows in diameter toward said rotary impeller.

7. The system of claim 5, wherein said means (iii) comprises
a separating chamber having an inlet connected to said outlets of said accelerating chambers and having a diameter which decreases from the top of said separating chamber downward, and
a concentrating area which is located in a bottom portion of said separating chamber and which is connected to said means (iv).

8. The system of claim 7, further comprising
a passageway, connected to an outlet of said means (iv), which conveys said clarified vapor stream out of said vapor clarification system.

9. The system of claim 1, wherein said means (iv) comprises a directing vane which defines a horizontal passage and which traps particulate matter in said passage after said moisture-laden vapor stream has been compressed and accelerated by said means (iii) and an annulus through which said clarified vapor stream rises and exits said air clarifier means via said outlet of said air clarifier means after it has been separated from said secondary vapor stream.

10. The system of claim 9, further comprising a casing which is positioned on said suction box and in which said air clarifier means is disposed, said casing including a vertically extending fan casing wall and a vertically extending scroll casing wall disposed radially outwardly of said fan casing wall, and wherein said directing vane is attached to said fan casing wall and said scroll casing wall and includes a vertical leg which defines said horizontal passage.

11. The system of claim 9, further comprising a tapering passage which is connected to said horizontal passage and to an outlet of said air clarifier means and which conveys said secondary vapor stream downwardly out of said air clarifier means from said horizontal passage.

12. A method of clarifying moisture-laden vapor containing particulates, comprising the steps of:
(A) drawing a moisture-laden vapor stream into an air clarifier via a fan; then
(B) imparting a downwardly spiraling motion to said vapor stream; then
(C) compressing and accelerating said vapor stream as it travels in said downwardly spiraling motion; then
(D) centrifugally separating said vapor stream into a clarified vapor stream which is generally free of particulates and a secondary vapor stream which is laden with particulates; and then
(E) removing said clarified vapor stream from said air clarifier.

13. The method of claim 12, wherein said step (D) comprises
trapping vapor and particulate matter in a horizontal passage defined by a directing vane of said air clarifier, thereby to form said secondary vapor stream within said passage, and
conveying said clarified vapor stream through an annulus of said clarifier and a vertical passage which is located above said annulus and which is connected to said annulus and to an outlet of said air clarifier.

14. The method of claim 12, further comprising the steps of
(F) removing said secondary vapor stream from said air clarifier and removing at least some of said particulates from said secondary vapor stream after said step (D), said particulates including fine dust, and then
(G) drawing said secondary vapor stream back into said air clarifier and accelerating said secondary vapor stream within said air clarifier such that further particulates are centrifugally separated from said secondary vapor stream.

15. The method of claim 14, wherein said step of removing at least some of said particulates from said secondary vapor stream is performed within a suction box on which said air clarifier is mounted.

16. The method of claim 14, wherein said step of removing at least some of said particulates from said secondary vapor stream is performed outside of a suction box on which said air clarifier is mounted.

17. The method of claim 14, wherein said step (A) comprises rotating a rotary impeller to impart axial energy to said moisture-laden vapor stream, thereby drawing said moisture-laden vapor stream into said air clarifier.

18. The method of claim 17, wherein said step (A) comprises accelerating said moisture-laden vapor stream as it is drawn into said air clarifier by said rotary impeller.

* * * * *